Patented Sept. 4, 1951

2,566,357

UNITED STATES PATENT OFFICE 2,566,357

SYNTHESIS OF DI-ARYL CYCLIC ETHERS

Milton Orchin and Elkin Oscar Woolfolk, Pittsburgh, Pa., assignors to the United States of America as represented by the Secretary of the Interior No Drawing. Application February 28, 1949, Serial No. 78,884

5 Claims. (Cl. 260—335)

(Granted under the act of March 3, 1883, as amended April 30, 1928; 370 O. G. 757)

The invention herein described and claimed may be manufactured and used by or for the Government of the United States of America for governmental purposes without the payment of any royalties thereon or therefor.

This invention relates to aromatic cyclic ethers and methods of preparing them.

It has previously been shown by one of the present inventors and Reggel (Am. Chem. Soc. 68, 505 (1947)) that 1-phenylnaphthalene undergoes cyclodehydrogenation to fluoranthene and that there is only slight migration of the phenyl group to give 2-phenylnaphthalene. In this reaction, there is intramolecular loss of hydrogen between the benzene nucleus and the naphthalene nucleus. Or more generically, it may be considered dehydrogenation between two aromatic nuclei.

We have found that cyclic ethers of the general formula

wherein R is a radical from the class consisting of phenyl, naphthyl, and hydrogenated naphthyl groups, and R' is the same or a different radical from the same class, may be prepared from two directly coupled aryl radicals, one of which has a hydroxyl group or low molecular weight alkoxy group in the ortho position to the carbon atom in the ring which is directly joined to the other aromatic radical. The reactant may be represented as

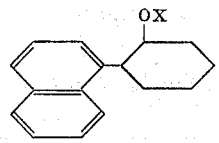

where X represents H, CH₃, or C₂H₅, etc. When H is hydrogen, this illustrated reactant will be 2'hydroxy-1-phenyl naphthalene. The cyclic ether from this specific di-aryl phenol is 1,9-benzoxanthene:

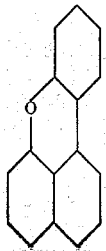

Other di-aryl phenolic compounds in which the hydroxy group is so situated that loss of a hydrogen molecule between the hydroxyl group and another aromatic ring will form a five- or six-membered ring, are suitable for cyclization by this present method. Such compounds are 1-hydroxy-8-phenylnaphthalene and 4-phenanthrol. Important derivatives of the latter compound are amenable to this reaction.

Some of the cyclic ethers of the types prepared by our process are a class suitable for use as biological products. Consequently, they are either distinctly valuable or potentially so.

It is an object of the present invention to convert directly-joined di-aryl compounds in which one of these aryl radicals contains an ortho substituted group, OH, CH₃, or C₂H₅, into a di-aryl cyclic ether. The aryl groups may be similar or dissimilar. The reaction may be carried out in the liquid phase. It is a more particular object of this present invention to achieve this synthesis under vapor-phase conditions.

It has been mentioned supra that the reactant compound may have a methoxy or ethoxy radical group in the ortho position instead of a phenolic hydroxyl group. These alkoxy groups are easily converted to the phenol group. This may be as a separate step or simultaneous with the step of cyclodehydrogenation.

Various catalysts may be used to cause cyclodehydrogenation of the above type phenols. In the liquid phase, we prefer to use a type of palladium-charcoal cataylst. For the vapor phase method, we prefer to employ chromia-alumina; the temperature of the reaction is higher.

Having explained the nature of our invention, a fuller understanding of it may be gained from a description of several specific embodiments. The following examples will further illustrate how our invention may be carried out in practice, but the invention is not restricted to these examples.

*Example I*

The preparation of the initial reactant, 1,2,3,4-tetrahydro - 1, o-anisyl-1-hydroxynaphthalene, will be first described.

The Grignard reagent was prepared by reacting 82.2 grams of freshly distilled o-anisyl bromide with 12.0 grams of magnesium in 325 cc. of dry ethyl ether. There was obtained a clear reddish-black solution, which was a solution of o- anisyl-magnesium bromide. This reaction may be represented by the equation:

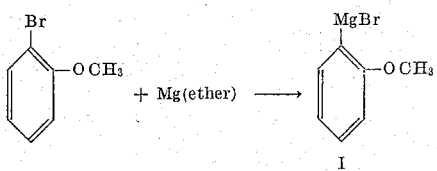

To this solution of the Grignard reagent, there was added dropwise with stirring a solution of 64.0 grams of pure vacuum fractionated 1-tetralone (II) in 150 cc. of dry ethyl ether. After all the tetralone had been added, the mixture was refluxed for 17 hours. During this time, 200 cc. of ethyl ether was replaced by an equivalent volume of benzene. The mixture was poured into ice and ammonium chloride solution. The organic layer was separated, washed well with water and saturated sodium chloride solution, and filtered through sodium sulfate. After removal of most of the solvent in vacuo, beautiful colorless crystals separated. These weighed 30.58 grams and had a melting point of 96.0°–100.2° C. An additional 47.0 grams of crystals which were almost as pure were obtained by evaporating the mother liquor. The reaction may be represented by the equation:

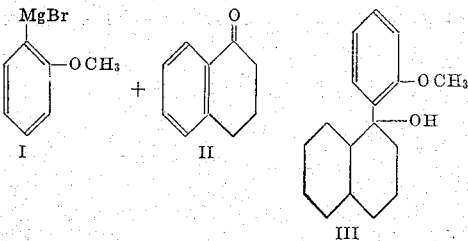

The sample for analysis was recrystallized from petroleum ether and had a melting point of 98.5°–100° C. Its element analysis gave

|  | Found by analysis | Calculated for $C_{17}H_{18}O_2$ |
| --- | --- | --- |
| Carbon | 80.5 | 80.3 |
| Hydrogen | 6.9 | 7.1 |
| Oxygen (by difference) | 12.6 | 12.6 |

This is 1,2,3,4-tetrahydro-1, o-anisyl-1-hydroxy-naphthalene (III). Whereas no claim is made herein to this compound, it is thought to be new.

30.0 grams of the above phenol (III) was heated with 1.0 gram of 30 percent palladium-charcoal catalyst with stirring at 240°–250° C. for two hours and at 250°–300° C. for 45 minutes. The catalyst had been prepared according to direction of Linstead and Thomas (J. Am. Chem. Soc. 1127 of 1940). During this treatment, about two grams of water distilled out of the mixture, and hydrogen was evolved. The reaction mixture was dissolved in benzene, filtered, and the benzene in the filtrate replaced with ethyl alcohol. On cooling, there was precipitated 25.5 grams of colorless crystalline material of a melting point 87°–90° C. An additional 0.3 gram was obtained from the mother liquor. Recrystallization of the solid material from ethyl alcohol gave crystals, with a melting point of 91.2°–92.6° C., which on analysis gave:

|  | Found by analysis | Calculated for $C_{17}H_{14}O$ |
| --- | --- | --- |
| Carbon | 86.5 | 87.2 |
| Hydrogen | 5.9 | 6.02 |
| Oxygen (by difference) | 7.6 | 6.8 |

This is 1-o-anisyl-1-naphthalene (IV). Whereas no claim is made herein to this compound, it is also thought to be new.

The simultaneous reaction of dehydration and dehydrogenation can be represented by the equation:

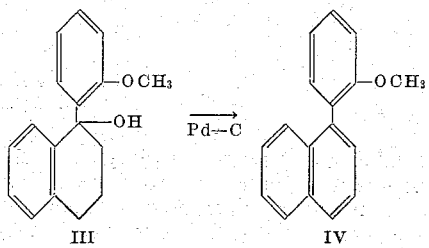

8.84 grams of the aromatic methyl ether (IV) in 200 cc. of acetic acid and 90 cc. of 48-percent hydrobromic acid were refluxed 5 hours. The solution was poured on ice and extracted with benzene ether. The organic solution was washed well with water, with sodium bicarbonate, water, and saturated sodium chloride solution. After drying, the solvent was evaporated and the residue distilled to give 7.85 grams of a colorless oil, boiling at 163°–170° C. (under 3 mm. pressure). This oil was made to crystallize by cooling and scratching. On recrystallizing from petroleum ether or alcohol, beautiful crystals appeared, but as soon as the solvent was removed, they lost their shape and became semi-fluid. If these crystals were then scratched or allowed to stand for a long time, firm crystalline material was again obtained.

This material is 2'-hydroxy-1-phenylnaphthalene (V), whose formula is:

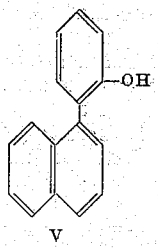

The melting point is 55°–60° C. The analysis was:

|  | Found by analysis | Calculated for $C_{16}H_{12}O$ |
| --- | --- | --- |
| Carbon | 86.6 | 87.2 |
| Hydrogen | 5.8 | 5.5 |
| Oxygen (by difference) | 7.6 | 7.3 |

A mixture of 3.0 grams of this last compound and 0.3 gram of palladium charcoal was heated at 320°–350° C. in a nitrogen atmosphere for 2 hours. The mixture was extracted with benzene and this solution filtered. 0.7 gram of 2,4,7-trinitrofluorenone was added to the concentrated extract. On cooling, 1.3 grams of dark brown crystals, with a melting point of 178°–190° C. separated. Recrystallization from acetic acid gave the pure complex of 1-9-benzoxanthene (VI') and 2,4,7-trinitrofluorene, amounting to a yield of 1-9 benzoxanthene corresponding to 13.5 percent of the 2'-hydroxy-phenylnaphthalene. The reaction is shown in the equation:

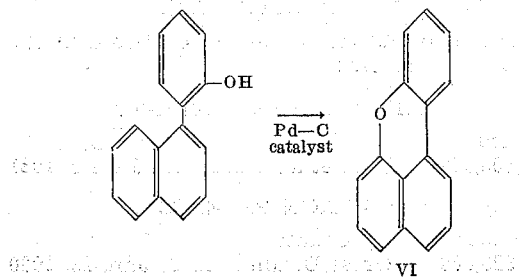

*Example II*

A mixture of 5.0 grams of o-phenylphenol and 0.5 gram of palladium-charcoal catalyst was heated for 3 hours at 285°–290° C. The mixture was extracted with petroleum ether and filtered. Unchanged o-phenylphenol was removed from the filtrate by washing with aqueous alkali. The petroleum extract was dried and chromatographed on a mixture of activated alumina and Celite. The components were selectively eluted from the column by using mixtures of petroleum ether-benzene, containing increasing quantities of benzene. The solutions were evaporated to dryness and the solids recovered. The first fractions gave a solid melting point 66°–69° C., which gave no depression to the mixed melting point of diphenyl.

The later fractions gave solids with melting point 81.5°–83° C., which gave no depression of the mixed melting point of true diphenylene oxide.

The simultaneous reactions of dehydrogenation and dehydration can be represented by the equation:

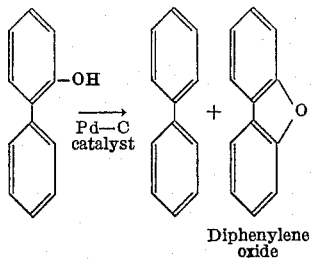

Diphenylene oxide

*Example III*

This example is an illustration of the vapor-phase method.

The catalyst tube was vertical and was heated by means of a standard combustion furnace. It was similar in construction to that described in an article by one of us (Ind. Eng. Chem. Anal. Ed. 17, 673, (1945)). The catalyst employed was a chromia-alumina catalyst (designated as Cr-181 by the Harshaw Chemical Company).

During the course of two hours, 7.1 grams of molten 2'-hydroxy-1-phenylnaphthalene was passed over 76 grams of the catalyst at 490° C. The partly crystalline material condensed in the receiver weighed 6.18 grams. This material was refluxed for a short time with a small volume of petroleum ether and the insoluble material filtered to give 1.4 grams with melting point 78°–91° C. Three crystallizations gave 0.47 gram of colorless crystals, melting point 96.2°–96.8° C. Anal. calcd. for $C_{16}H_{12}O$: 87.2; H, 5.5. Found: C, 87.7; H, 5.7. The infrared absorption spectrum of the compound showed a strong band in the 2.8 micron region, indicating the presence of a hydroxy group. This compound is regarded as 2'-hydroxy-2-phenylnaphthalene.

All mother liquors were combined and chromatographed on alumina-cellite. Two percolate fractions were collected; the column extruded, and arbitrarily cut into four fractions. Fraction 4 gave 0.12 gram of material, which after two recrystallizations from ethanol, was obtained as colorless plates of melting point 209.2°–209.8° C. Anal. calcd. for $C_{16}H_{10}OO$: C, 88.1; H, 4.6. Found: C, 88.3; H, 5.1. This material was identical (melting point, mixed melting point, ultraviolet absorption spectrum) with a sample of brazan obtained from the Gezellschaft fur Teerwertung.

The reaction is believed to take place through rearrangement as follows:

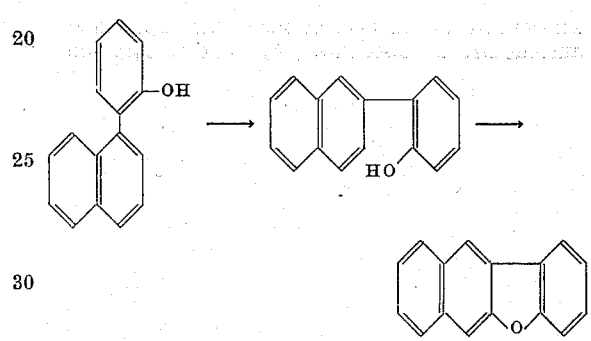

Brazan is benzo b naphtho 2,3-d furan.

Other modes of applying the principle of our invention may be employed instead of those explained. Changes may be made as regards the methods or particular compounds stated provided they come within the scope of the claims.

We claim as our invention:

1. A method for the preparation of benzoxanthene comprising the step of dehydrogenating a compound of the formula

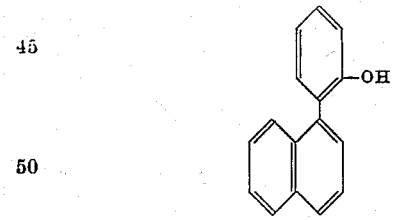

wherein the 2- and 8-positions in the naphthalene nucleus are unsubstituted by heating said compound in the liquid phase in the presence of a dehydrogenation catalyst.

2. The process according to claim 1 wherein the dehydrogenation catalyst comprises palladium.

3. A method for the preparation of brazan comprising the steps of dehydrogenating a compound of the formula

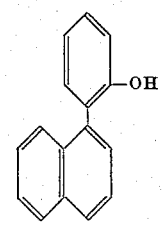

wherein the 2- and 8-positions in the naphthalene nucleus are unsubstituted by heating said compound until vaporization of said compound takes place and then passing the heated vapors over a dehydrogenation catalyst.

4. The process according to claim 3 wherein the dehydrogenation catalyst is a chromia-alumina catalyst.

5. A method for the preparation of aromatic cyclic ethers containing a phenylnaphthalene aromatic nucleus comprising the steps of dehydrogenating a compound of the formula

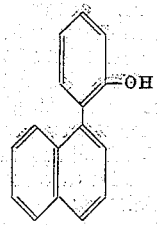

wherein the 2- and 8-positions in the naphthalene nucleus are unsubstituted, by heating said compound at least to liquefaction in the presence of a dehydrogenation catalyst.

MILTON ORCHIN.
E. OSCAR WOOLFOLK.

REFERENCES CITED

The following references are of record in the file of this patent:

UNITED STATES PATENTS

| Number | Name | Date |
|---|---|---|
| 1,808,349 | Hale et al. | June 2, 1931 |

FOREIGN PATENTS

| Number | Country | Date |
|---|---|---|
| 323,806 | Great Brtain | Jan. 13, 1930 |

OTHER REFERENCES

Orchin and Reggel, J. Am. Chem. Soc. 70, 1245–1247 (1948).